No. 769,835. PATENTED SEPT. 13, 1904.
E. C. ROBERTS.
CHECK ROW ATTACHMENT FOR CORN PLANTERS.
APPLICATION FILED DEC. 3, 1903.
NO MODEL. 2 SHEETS—SHEET 1.
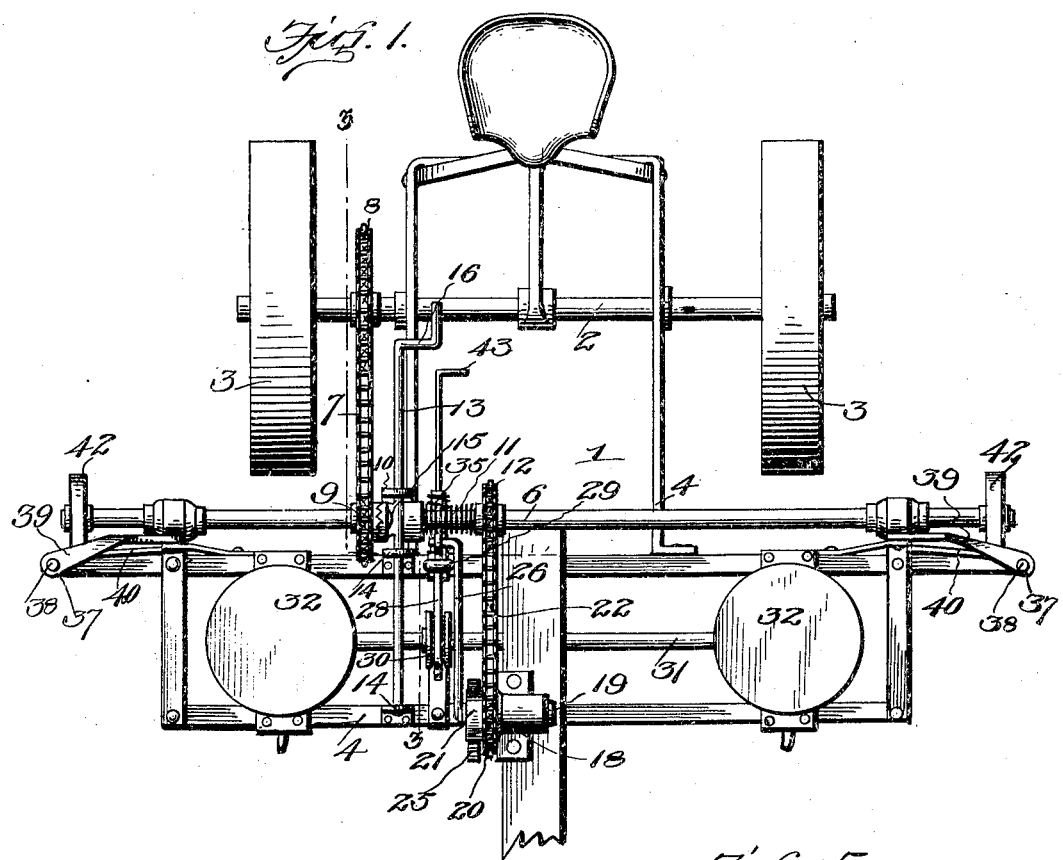
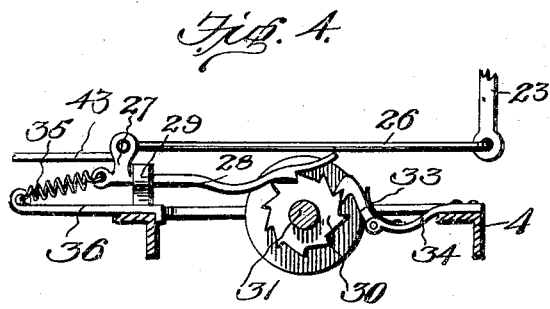
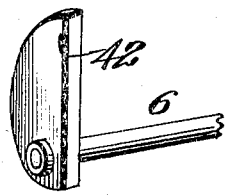
Witnesses
Inventor
Elvis C. Roberts
By
Attorney No. 769,835. PATENTED SEPT. 13, 1904.
E. C. ROBERTS.
CHECK ROW ATTACHMENT FOR CORN PLANTERS.
APPLICATION FILED DEC. 3, 1903.
NO MODEL. 2 SHEETS—SHEET 2.

Witnesses

Inventor
Elvis C. Roberts
By H. B. Wilson
Attorney

No. 769,835.                                                                                           Patented September 13, 1904.

UNITED STATES PATENT OFFICE.

ELVIS C. ROBERTS, OF HOLDENVILLE, INDIAN TERRITORY.

CHECK-ROW ATTACHMENT FOR CORN-PLANTERS.

SPECIFICATION forming part of Letters Patent No. 769,835, dated September 13, 1904.

Application filed December 3, 1903. Serial No. 183,590. (No model.)

*To all whom it may concern:*

Be it known that I, ELVIS C. ROBERTS, a citizen of the United States, residing at Holdenville, in the county of Creek Nation, Indian Territory, have invented certain new and useful Improvements in Check-Row Attachments for Corn-Planters; and I do declare the following to be a full, clear, and exact description of the invention, such as will enable others skilled in the art to which it appertains to make and use the same.

This invention relates to improvements in check-row attachments for corn or other seed planters.
The object of the invention is to provide an attachment for planters whereby the corn or other seed will be discharged from the hoppers at predetermined intervals and in even rows.
Another object is to provide a marker in connection with the check-rowing device which will be operated as the planter is moved along to mark the place for the next row of seeds to be planted.
A further object is to provide an attachment of this character which will be simple in construction, strong and durable, efficient and reliable in operation and which may be attached to corn-planters now in use.
With these and other objects in view the invention consists of certain novel features of construction, combination, and arrangement of parts, as will be more fully described, and particularly pointed out in the appended claims.

Figure 2:
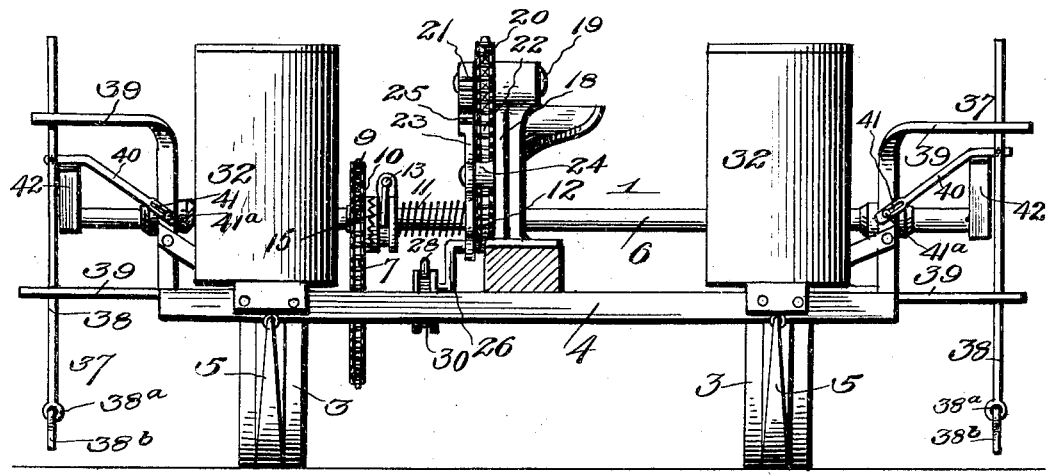
Figure 3:
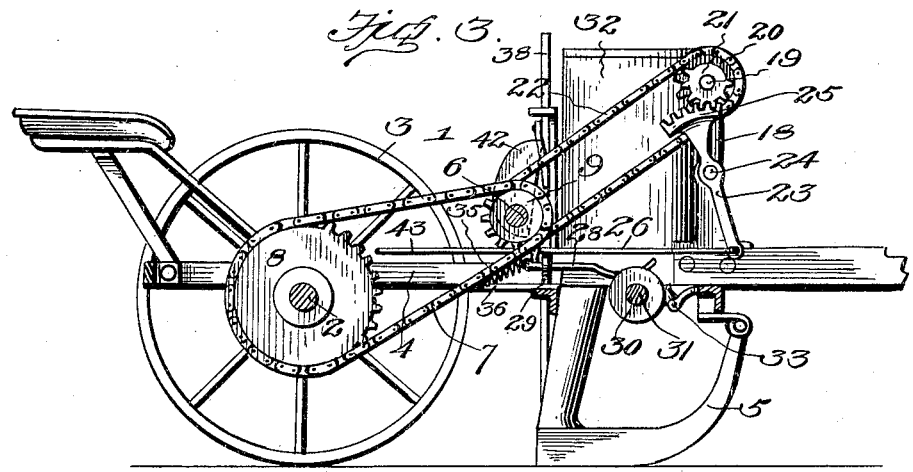

In the accompanying drawings, Figure 1 is a top plan view of a portion of a corn-planter, showing the application of the invention thereto. Fig. 2 is a front elevation of the same.
Fig. 3 is a longitudinal vertical sectional view on the line 3 3 of Fig. 1. Fig. 4 is a detail sectional view of the actuating mechanism of the feed-hoppers. Fig. 5 is a detail perspective view of one of the marker-operating cams.

Referring more particularly to the drawings, 1 denotes a corn-planter, which may be of the ordinary or any suitable construction.

2 denotes the axle, and 3 the ground or supporting wheels, of the machine.

4 denotes the framework, supported at its rear end upon said axle and at its forward end upon runners or furrow-openers 5.

6 denotes the main drive-shaft, which is geared to the power-shaft or axle 2 by a sprocket-chain 7, which is connected to a sprocket-wheel 8, fixed on said axle 2, and to a sprocket-pinion 9, which is loosely mounted on the shaft 6. The pinion 9 is provided on one of its faces with one member of a clutch 10, the opposite member of which is slidably mounted on the shaft 6 and is adapted to be normally engaged with the pinion member by means of a coiled spring 11, which is confined on said shaft between said sliding clutch member and a stop fixed on the shaft, said stop being a sprocket-wheel 12, which will be hereinafter described.

A horizontally-disposed shifting-lever 13 is mounted in brackets 14, secured to the frame 4, and is provided with a depending right-angularly-disposed forked clutch-engaging device 15, which engages the sliding member of the clutch 10. The lever 13 is formed on its rear end with a crank-handle 16, by which the same is turned to shift said sliding clutch member out of engagement with said pinion member, thereby throwing the drive-shaft 6 out of gear.

An upright bearing-standard 18 is fixed on the rear end of the tongue of the planter, and in the upper end of the standard is journaled a short stub-shaft 19, on one end of which is mounted a sprocket-wheel 20, having integrally formed thereon or connected therewith a mutilated spur gear-pinion 21. A sprocket-chain 22 connects the sprocket-wheel 20 with the sprocket-wheel 12 on drive-shaft 6, whereby the wheel 20 and mutilated pinion 21 are driven.

A vertically-disposed arm or lever 23 is pivotally connected about midway its length upon a stud 24, projecting from the side of the bearing-standard 18. On the upper end of the arm 23 is formed a segmental rack 25, the teeth of which are adapted to mesh with the teeth of the mutilated gear-pinion 21 and by which said arm or lever is intermittently rocked or swung on its pivot-stud 24. To the lower end of the arm 23 is pivotally connected one end of a rearwardly-projecting trip-rod 26, the inner end of which is pivotally connected to a short arm or lug 27, secured to one end of a sliding dog or pawl 28, which is mounted in a bracket 29, secured to the frame 4 of the machine. The forward end of the dog or pawl 28 is adapted to engage a flanged ratchet-wheel 30, fixed on a valve-operating shaft 31, which is connected at its ends with the seed-valves (not shown) of the seed-hoppers 32, arranged upon each side of the frame 4 and whereby said valves are actuated to intermittingly drop the seed from said hoppers through seed-tubes in the rear of the runners or furrow-openers 5. A spring-controlled locking-pawl 33 is pivotally connected to an arm 34 on the frame to engage the teeth of the ratchet-wheel 30 and prevent a retrograde movement of the same. A coiled spring 35 is connected at one end to the inner end of the sliding pawl 28 and at its opposite end to an arm or bracket 36. The office of the spring 35 is to retract the pawl 28 and trip-rod 26 and to swing the arm 23 back to its normal position after being acted on by the mutilated gear to project said trip-rod and pawl.

Markers 37 are arranged at each side of the machine, consisting of vertically-disposed rods 38, slidably mounted in guide-brackets 39, fixed on the frame 4. The lower end of each rod is provided with an eye 38$^a$, to which is loosely connected a short section of rod 38$^b$. This loose connection on the lower end of the marker-rods prevents the same from catching onto weeds or trash and also permitting the rods to drag out of the ground after each puncture instead of tearing or breaking out, as would be the case of a rigid rod. To each rod 38 is pivotally connected the upper end of an inclined brace-rod 40, in the lower ends of which are formed slots 41 to engage headed pins 41$^a$, by which said rods are slidably and pivotally connected to the vertical portion of the guide-brackets 39.

On the ends of the drive-shaft 6 are fixed semi-elliptical cams 42, the curved sides of which are adapted to be brought into engagement with the under side of the upper end of the rods 40 upon the revolving of said shaft, thereby raising the marker-rods 38 and the brace-rod 40 until the flat side of the cam is brought around to the front or adjacent to the marker-rod, at which time the cam will become disengaged from the rod 40 and allow the same and the marker-rod 38 to drop by gravity, the lower end 38$^b$ of the rod entering and marking the ground. As the cam revolves the rod 40 will again be engaged by the round side thereof and the marker-rod lifted as formerly described.

In order that the seed-valves may be manually operated at any time, a rearwardly-projecting rod 43 is connected at its forward end to the arm or lug 27 of the sliding dog or pawl 28. On the opposite end of the rod 43 is formed a handle. By disconnecting the trip-rod 26 from the lug 27 the pawl or dog 28 may be reciprocated by hand over the ratchet-wheel 30, thereby turning the valve-shaft 31 to actuate the seed-valves, as hereinbefore described.

While I have shown and described the operative parts of the device as driven from a main drive-shaft by a sprocket-chain and gears, it will be obvious that other means may be employed within the scope of the invention to operate these parts to produce an intermittent feed for the machine.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a planter, the combination of a revoluble valve-operating shaft having a ratchet-wheel, a pawl engaging the latter to prevent reverse rotation of the shaft, a reciprocating pawl coacting with the ratchet-wheel to rotate the shaft by a step-by-step movement, a spring to move the reciprocating pawl in one direction, a rocking element connected to the reciprocating pawl, to move the latter against the tension of said spring, said rocking element having a segment-gear, a mutilated gear to engage and disengage the segment-gear and means to rotate said mutilated gear, substantially as described.

2. In a planter, the combination of an axle-shaft having ground-wheels to revolve it, a drive-shaft having cams, vertically-movable gravitating markers, elevated and disengaged by the said cams when the same are rotated, connections between the axle-shaft and the drive-shaft to rotate the latter and the cams, a valve-operating device, an oscillating element to actuate said valve-operating device, and having a segment-gear, a spring, a mutilated gear engaging the segment-gear and coacting with the spring to actuate the oscillating element, and connections between the drive-shaft and the mutilated gear, to rotate the latter, substantially as described.

3. In a check-row attachment for planters, the combination with an operating element, of a valve-operating shaft, a ratchet-wheel fixed on said shaft, a reciprocating pawl, adapted to engage said ratchet-wheel, a swinging element to operate said pawl in one direction and means to retract the same, means operated by said main drive-shaft to intermittently actuate said swinging element, substantially as described.

4. In a check-row attachment for planters, the combination with an operating element, of a valve-operating shaft, a ratchet-wheel fixed on said shaft, a reciprocating pawl, adapted to engage said ratchet-wheel, a mutilated gear driven by said main drive-shaft, a pivoted swinging arm having formed on its upper end a segmental rack adapted to be intermittently engaged by said mutilated gear, a trip-rod connected to the lower end of said swinging arm to actuate said reciprocating pawl in one direction, and a spring to move the same in the reverse direction, substantially as described.

5. In a check-row attachment for planters, the combination with an operating element, of a valve-operating shaft, a ratchet-wheel fixed on said shaft, a reciprocating pawl, adapted to engage said ratchet-wheel, a mutilated gear driven by said main drive-shaft, a pivoted swinging arm having formed on its upper end a segmental rack adapted to be intermittently engaged by said mutilated gear, a trip-rod connected to the lower end of said swinging arm to actuate said reciprocating pawl in one direction, a spring to move the same in the reverse direction and means whereby said pawl may be manually reciprocated, substantially as described.

In testimony whereof I have hereunto set my hand in presence of two subscribing witnesses.

ELVIS C. ROBERTS.

Witnesses:
W. S. JACOBS,
EMILY RIDER.